United States Patent [19]

Gest

[11] Patent Number: 4,818,218

[45] Date of Patent: Apr. 4, 1989

[54] INTERNAL COMBUSTION BURNERS

[75] Inventor: René Gest, Rantigny, France

[73] Assignee: Isover Saint-Gobain, Paris La Défense, France

[21] Appl. No.: 945,184

[22] Filed: Dec. 23, 1986

Related U.S. Application Data

[63] Continuation of Ser. No. 752,500, Jul. 8, 1985, which is a continuation of Ser. No. 478,913, Mar. 25, 1983.

[30] Foreign Application Priority Data

Apr. 6, 1982 [FR] France .................... 82 05919

[51] Int. Cl.[4] ............................................. F23R 3/54
[52] U.S. Cl. ........................................ 431/158; 431/9; 431/173; 431/348; 65/5; 65/16
[58] Field of Search ............... 431/9, 158, 173, 180, 431/348; 65/5, 6, 14, 16

[56] References Cited

U.S. PATENT DOCUMENTS

| | | | |
|---|---|---|---|
| 685,230 | 10/1901 | Speirs | 431/346 X |
| 687,715 | 12/1901 | Bayles | 431/346 |
| 713,421 | 11/1902 | Fouche | 431/346 |
| 1,146,626 | 7/1915 | Jean | 431/173 |
| 1,614,085 | 1/1927 | Runyan | 431/9 X |
| 1,670,819 | 5/1928 | Morris et al. | 431/173 X |
| 2,224,466 | 12/1940 | Baker et al. | 65/16 |
| 2,474,313 | 6/1949 | Hess | 431/348 |
| 2,800,175 | 7/1957 | Sharp | 431/9 |
| 3,019,477 | 2/1962 | Kleist | 431/158 X |
| 3,083,759 | 4/1963 | Williams | 431/348 |
| 3,084,525 | 4/1963 | Levecque et al. | 431/158 X |
| 3,096,812 | 7/1963 | Kervin | 431/158 |
| 3,363,663 | 1/1968 | Porter | 431/158 X |
| 3,372,012 | 3/1968 | Porter | 65/14 |
| 3,836,315 | 9/1974 | Shular | 431/9 |
| 3,843,307 | 10/1974 | Staudinger | 431/9 |
| 4,087,234 | 5/1978 | Delyannis | 431/168 |
| 4,102,662 | 7/1978 | Levecque et al. | 65/5 |
| 4,118,213 | 10/1978 | Levecque et al. | 65/5 |
| 4,351,660 | 8/1982 | Plantard et al. | 65/5 |
| 4,353,688 | 10/1982 | Ahner et al. | 431/173 |

FOREIGN PATENT DOCUMENTS

| | | | |
|---|---|---|---|
| 1094848 | 12/1954 | France | 431/9 |
| 2004052 | 3/1974 | United Kingdom | 431/348 |

Primary Examiner—Margaret A. Focarino
Attorney, Agent, or Firm—John T. Synnestvedt; Richard D. Weber

[57] ABSTRACT

This invention relates to internal combustion burners. In the burners according to the invention, the combustible mixture flows in counter-current to the combustion gases while in contact with the same, and the introduction of the mixture into the combustion chamber is effected along a wall of said chamber and the emitted gases leave the chamber along a second wall thereof, the two walls being opposite one another. The burners according to the invention, which have improved performance and versatility of use, are of use more particularly for mineral fibre drawing processes.

14 Claims, 5 Drawing Sheets

INTERNAL COMBUSTION BURNERS

This is a continuation of co-pending application Ser. No. 752,500 filed on July 8, 1985, which is a continuation of Ser. No. 478,913, filed Mar. 25, 1983, now abandoned.

This invention relates to internal combustion burners which produce streams of high-temperature gas at high speed. More particularly, the invention relates to burners of this type used in mineral fibre forming processes and in which the fibres are drawn by the action of the streams of gas emitted by the said burners on their own, or in combination with other means such as centrifugation means.

The burners in question operate more particularly with combustible mixtures and a low flame propagation speed. Conventionally, in this type of burner, a mixture of fuel and air is introduced through a grid at one end of a combustion chamber, where it is burnt. The combustion products are discharged at the other end of the combustion chamber at high temperature and high speed.

Burners of this type are described more particularly in French Pat. No. 1 292 222 and its addition No. 90 660.

The difficulties conventionally encountered with this type of burner for low flame propagation speed combustible mixtures, such as mixtures of air and natural gas or butane or propane, are due to some operating instability. More particularly, it is difficult to locate the position of the flame in the burner even when the latter is steadily operating. The disadvantages are all the greater when the burners are started up. Instability under certain conditions of operation—quite apart from the extremely loud noise—may even result in flame blow-out.

The features enumerated in the above patents provide some improvement of the operating conditions of this type of burner. In particular, the presence of bars rear the grid promotes better mixing of the gases and better ignition. It particularly promotes better flame location and hence improved stability.

Despite these improvements, there are still a number of difficulties. The starting up of the burner is still a complex operation and generally the burners in quetion adapt with difficulty to changes in respect of their state of operation and/or the fuel.

Also, for certain uses, it is absolutely essential to produce a very intense and very hot stream of gas from burners of restricted external size. This type of constraint is found particularly in uses for the production of mineral fibres. It is difficult to satisfy these two requirements simultaneously with conventional burners. If the amount of combustible mixture admitted to a restricted size burner is increased, the flame tends to become detached from the grid and/or a considerable proportion of the mixture burns outside the burner in the form of a weak flame which cannot be used for fibre drawing.

The use of burners in fibre drawing processes—irrespective of what kind of process—requires uniform conditions for all the gases produced. More particularly, if the fibres are to have stable characteristics, the speed of flow of the gases and their temperature must be perfectly uniform both in the course of time and also throughout the stream of gas formed. Flame instability, no matter for what reason, results in an inhomogeneous gas flow and non-uniform drawing.

The object of the invention is to provide an internal combustion burner of a new type which at least partly solves the problems raised by the operation of conventional burners.

More particularly, the object of the invention is to provide a burner wherein the flame propagation is effected under conditions of better stability irrespective of the state of operation selected or the fuel used.

Another object of the invention is to provide a burner of reduced size which in comparison with the operating conditions obtained with conventional burners provides improved operating conditions and particularly an improved heat loading, i.e. the ratio of the rate of flow of combustible gas to the chamber volume, by maintaining complete combustion.

These objects and other advantages referred to hereinafter are achieved with the burner according to the invention, in which the combustion conditions in the chamber are changed by changing the method of circulation of the gas flows.

According to one feature of the invention, the admission of the combustible gas mixture and the ejection of the combustion products are effected in the combustion chamber on substantially the same side.

According to another feature of the invention, the combustible gases are admitted in countercurrent to the ejection of the combustion products.

According to another feature of the invention, the combustible gases are admitted in such a manner that they flow along a first wall of the combustion chamber and flow back to the outlet orifice along another wall of the combustion chamber substantially opposite the first wall.

It is noteworthy that according to the invention and contrary to the prior-art arrangements the invention does not attempt to provide better stabilization of the flame on a burner grid. Preferably, in the burner according to the invention, the gas mixture is not introduced into the combustion chamber through a grid and yet the stability of the flame is substantially improved.

The above features are also noteworthy in that they do to some extent possibly appear to lead to results contrary to those required. The production of a high speed at the burner outlet might in fact appear to oppose the arrangement eccording to the invention, which comprises having the incoming mixture to the burner flow in countercurrent to the gas emitted. Experiment, however, has shown that the introduction of the combustible mixture in countercurrent does not obstruct the production of high speeds and in fact quite the contrary.

One of the reasons for the improvements found in the use of the burners according to the invention appears to lie in the way in which ignition takes place.

In conventional systems, the use of a grid or, and this is equivalent, a wall formed with a large number of small orifices, is justified because highly localized turbulence occurs at each orifice. These turbulences create an equal number of points where the gas speed decreases considerably or even hecones zero. In these "retarded" currents, the flame can be maintained although the speed of propagation is low in relation to the gas flow taken as a whole. If the number of orifices is multiplied, the number of potential ignition points in the combustible mixture is multiplied. However, at high rates of flow the grid is not always adequate and the use of additional baffles, such as the bars that we have indicated hereinbefore, is equivalent to complementing the effect of the grid farther downstream inside the chamber.

Ignition of the combustible mixture in the burner according to the invention is effected differently. A number of phenomena contribute to this ignition and, in particular, contact (a) with the combustion gases and (b) with the burner wall.

The counter-current flow of the combustion gases and the combustible mixture has the result that as soon as the latter enters the combustion chamber it is brought into contact and mixed superficially with very high-temperature gases which initiate its ignition.

The combustible mixture is also so directed as to flow along the burner wall close to the inlet orifice. In the conventional systems, the temperature in the region of the grid is not very high. The hottest zones are situated towards the burner outlet. This temperature distribution does not promote ignition on entry to the combustion chamber. According to the invention, contrary to this, the wall along which the incoming gases flow is brought to high temperature mainly by the radiation emitted by the wall opposite it, which is in contact with the combustion gases.

The temperature of the wall along which flow the gases admitted into the combustion chamber arises from a complex equilibrium. Even if the incoming gases have been pre-heated, they are at a temperature very much below the mean temperature in the combustion chamber. They tend to "cool" the wall situated near the admission point. This effect is similar to what is found in the prior art in which the burner grids remain at a relatively low temperature although they are situated inside the combustion chamber.

The invention, which provides for the combustible mixture to be admitted along one wall situated opposite another wall along which the combustion gases flow, results in an intense radiation from the second wall towards the first, which is thus brought to a very high temperature. This temperature is in fact much higher than found in the absence of such radiation and which would be due solely to the proximity of the ignited gases.

The fact that the combustible mixture is introduced on a very hot wall promotes the early ignition of the mixture.

The operation of the burner according to the invention is therefore characterised more particularly by increased heat exchanges inside the combustion chamber. These considerable heat exchanges are one of the causes of the improvement found in the performance.

We have just seen that the burner according to the invention improves combustion by very rapidly bringing the combustible mixture to high temperature. There are also advantages in not "fixing" the flame on a grid.

In the prior-art systems, when the flame "detaches" from the grid for some reason there is a considerable risk of flutter and extinction, because the non-ignited gases do not immediately encounter points which act as a support for the flame.

In the embodiment according to the invention, location of the flame in the gas path is not restricted to a given level and so the points of support of the flame are not situated specifically at the inlet orifice although to a lesser degree the edges thereof can act in the same way as each orifice in the grid in the prior-art burners. The support for the flame is primarily obtained by a varying extent of the wall of the chamber along which the incoming gases flow.

One advantage of using the wall as a support for the flame is, as indicated hereinabove, that its temperature is less the result of the contact with the gases that it ignites than the result of adsorption of the radiation from the chamber as a whole (more particularly the opposite walls). Under these conditions it will be seen that this temperature is less sensitive to instantaneous variations in the state of the gases and that ignition is more uniform.

Another effect of using the wall is considerably to increase the useful potential ignition zone. This is advantageous under stable operating conditions and complete combustion of the gases is facilitated as a result. It is even more advantageous when the state of operation or gas composition is modified. The supporting zone establishes itself in the corresponding most appropriate part of the chamber.

It is also by this arrangement and by establishing a counter-current flow that it is possible to increase the thermal loading while maintaining good burner operation.

To obtain satisfactory results, the wall along which the incoming gases flow is advantageously made from a refractory material with roughened portions. The roughened portions need not necessarily be of large dimensions. All that is required is that the incoming gases should engage on contact therewith, i.e., a multiplicity of very small turbulences form along the surface of the wall.

The characteristics of the burner according to the invention, its method of operation, its preferred uses and the results obtained are described in detail in the following description with reference to the accompanying drawings wherein:

FIG. 3b is a larger-scale view of a detail of the supply orifice of the burner shown in FIG. 3a.

FIG. 4 is a partial cross-section on the line A—A of a burner as shown in FIG. 3a.

Figure 1:
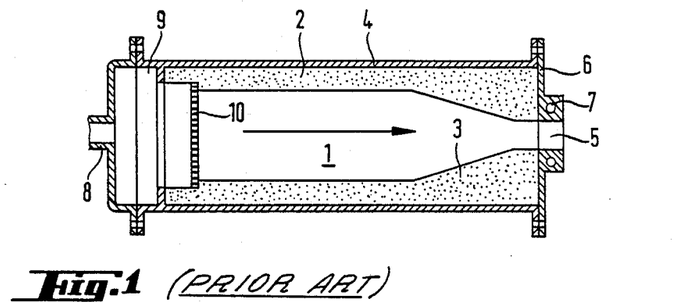
FIG. 1 is a section of an internal combustion burner of conventional structure.

The conventional burner shown in FIG. 1 comprises a combustion chamber 1 defined by refractory walls 2 and 3 forming the burner body. Walls 2 and 3 are covered and protected on the external surface by a metal casing 4. At one end the combustion chamber 1 has an aperture 5 through which the combustion gases escape. At this end the refractory walls are covered by a metal flange 6 which also forms the walls of the aperture 5. A cooling system 7 keeps the flange temperature at a tolerable level for the material from which the flange is made.

The combustible mixture is supplied via the conduit 8 to the supply chamber 9 and flows into the combustion chamber 1 through the grid 10.

In the improved forms described in the prior-art patents referred to hereinbefore, baffles, e.g. in the form of silica bars, are disposed a short distance downstream of the grid 10 in the path of the gas mixture. These bars are not shown in FIG. 1.

It will readily be seen that the gases in this system progress from the supply end to the end containing the combustion gas expansion aperture. The linear arrangement is accompanied by a minimum of turbulence. In stable operation the flame is fixed to the orifices of the grid 10, i.e. at a point in the combustion chamber 1 where the temperature is relatively low, for it is practically not in contact with the combustion gases and the passage of the combustible mixture provides some cooling. Also, the points of support of the flame are directly in the path of the gases entering the chamber, and particularly at high rates of flow this does not promote stability.

In alternative forms of conventional b:uners the combustion chamber 1 may have other configurations than that shown in FIG. 1. More paticularly, in the case of annular burners used in fibre forming apparatus comprising a centrifuge system for distributing the material, the space conditions may necessitate a chamber in the form of a bend. Nevertheless, even in these alternative forms, the supply is at one end and the combustion gaees are emitted at the other end of the combustion chamber and the gas generally progresses from one end to the other without there being any counter-current flow according to the invention, and without the heating of the wall along which the incoming gases flow.

Figure 2:
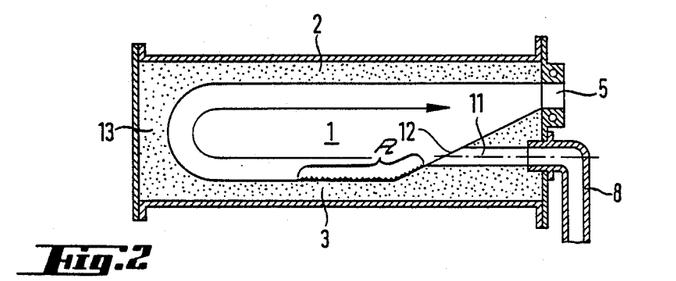
FIG. 2 is a section of a burner according to the invention.

In the embodiment of the invention illustrated diagrammatically in FIG. 2, the combustion chamber 1 is closed at one end. The combustible mixture is supplied via conduit 8 which is disposed on the same surface of the burner as the expansion aperture 5.

The conduit 8 through which the combustible mixture is supplied is continued in the form of a duct 11 in the refractory material. This duct leads into a combustion chammber 1 via an orifice 12.

The combustible mixture passes freely from duct 11 to chamber 1. There is no grid acting as a fame support. If required, as a safety measure, a flame non-return grid (not shown) may be provided at the end of the conduit 8, but the flames do not develop on contact therewith.

The gas mixture is introduced into the chamher on a path extending along the refractory wall 3. This movement of the gases takes them away from the expansion aperture 5. They are kept along the wall by the initial speed of the jet and by the pressure of the combustion gases flowing in the direction of the aperture 5.

To facilitate the progression of the gases in the chamber, the refractory wall forming the closed end 13 is advantageously curved. The reversal of the direction of flow of the gases in the chamber is thus produced uniformly and, in particular, the hole of the volume of the chamber is swept by the gases. This obviates any substantially inactive zones in which some of the gas would be more or less immobilized.

In FIG. 2, the end section 13 of the chamber is of semi-circular shape, but any profile promoting the flow and reversal of the directon of the gases is advantageous.

As they flow along the wall 13 the gases are directed towards the aperture 5, the limited section of which contributes to the acceleration.

In this type of burner, ignition occurs after the orifice 12 of the duct 11 introducing the mixture into the chamber. It also develops near this orifice along the wall 3. Substantially instantaneous ignition of the mixture as soon as it pentrates into the combustion chamber is promoted by the contact with the combustion gases extending towards the aperture 5 and by contact with the wall 3 which is brought to high temperature by the combustion developing therein and, more particularly, by absorption of the radiation emitted by the other walls of the combustion chamber, more particularly the opposite wall.

To fix the flame along the wall near the orifice 12 the surface can be modified so as to have pronounced roughened portions R at this point. These roughened or projecting portions penetrate into the flow of gas and result in small turbulences in the wake of the gases. The overall speed of the gases varies considerably in these turbulences, but there are very low speed points which promote propagation of the ignition of the gas.

The roughened portions in question may be of widely varying forms. They may be in the form of points, grooves, and so on. They may also be provided just at some places along the walls of the combustion chamber, and more particularly the part adjacent the orifices 12, or all of these walls.

In practice, the refractory walls formed, for example, by moulding a refractory cement are sufficiently rough to fix the flame and it will not be necessary to provide additional roughened portions.

Figure 3A:
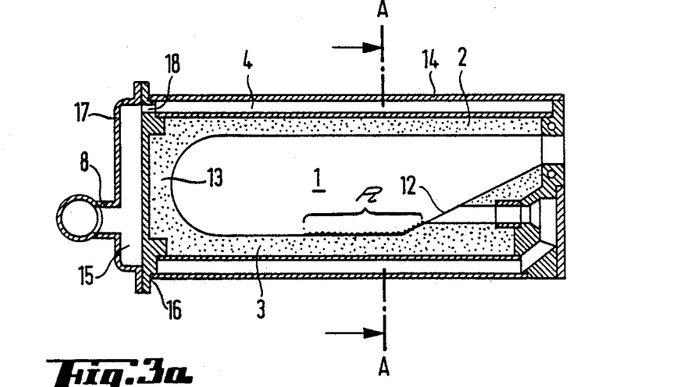
FIG. 3a is another embodiment of a burner according to the invention similar to that shown in FIG. 2.

Referring to FIGS. 2 and 3, the wall 2 along which the outgoing gases flow is shown as being flat. In order to increase the temperature of this wall still more in the part opposite the combustible mixture inlet zone, it may be advantageus to give the wall a profile which further promotes its contact with the outgoing gases. More particularly, this part of the wall may be slightly advanced towards the interior of the chamber or else form a narrower section for the passage of the gases. Of course this modified profile must not appreciably disturb the gas flow.

Better contact between the outgoing gases and the wall, and a higher resulting temperature, result in a likewise more intensive radiation emitted by the wall.

Figure 3B:
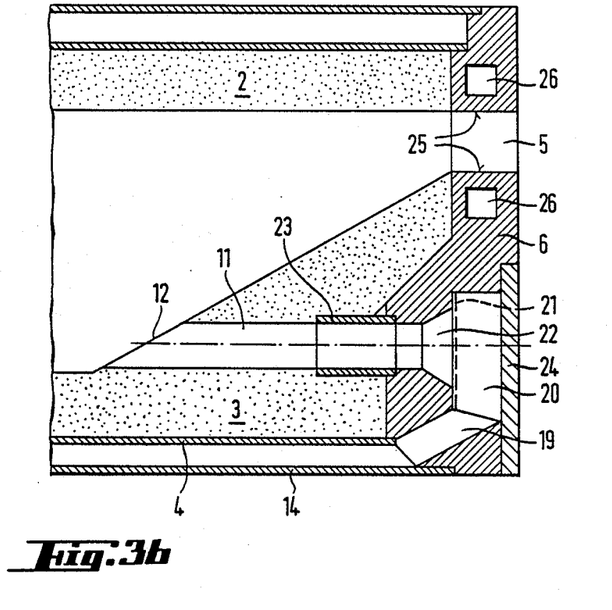

FIGS. 3a and 3b show another embodiment of a burner according to the invention, which is distinguished from the one shown in FIG. 2 mainly in respect of the manner in which the combustible gas mixture is led to the chamber 1.

The burner body is covered by a double casing or jacket 4, 14 in which the combustible mixture flows before entering the combustion chamber. The wall 4 in contact with the refractory material is at a temperature very much higher than the ambient temperature and the combustible mixture is pre-heated, thus further improving the burner performance.

In the embodiment shown in FIGS. 3a and 3b, the mixture is taken to the rear of the burner by the conduit 8. It enters a compartment 15 defined by the flange 16 and the casing 17. From compartment 15 the gases flow into the double jacket via orifices 18.

In FIG. 3a the combustible mixture is introduced at the top part of the double casing and is fed to the bottom part elong the sides of the burner and then into the supply compartment shown in FIG. 3b.

From the double casing the mixture passes via aperture 19 in flange 6 into the supply compartment 20. A flame non-return grid 21 is provided over the orifice 22 of the flange leading to the duct 11. Duct 11 and orifice 22 are centred by means of a sleeve 23.

The supply compartment is closed on the front surface of the burner by a hatch 24 which provides access to the grid 21. The grid may require changing if clogged by the scale entrained with the combustible gases. To obviate this difficulty, the grid 21 may advantageously be replaced by a diaphragm. The latter is adjusted so that the speed of flow of the mixture there is greater than the speed of propagation of the flame.

The fixing means (screws, bolts, etc) for the various burner components have been omitted in order to simplify the drawing.

The edges of the flange 6 in contact with the combustion products form the lips 25 of the burner. These lips are cooled by a liquid coolant in the ducts 26.

The burners in question are normally used to produce a stream of combustion gases of a certain transverse dimension. The overall structure of the burner remains as we have described hereinabove and some of the elements are repeated at regular intervals to ensure uniform operation over the entire width.

Figure 4:
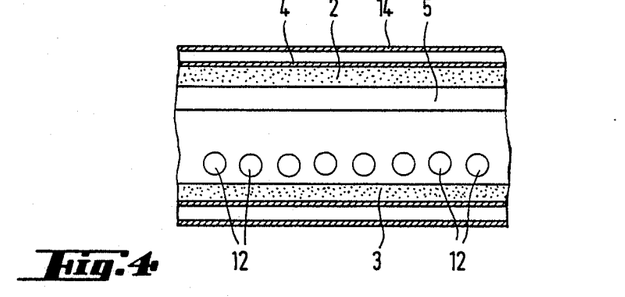

FIG. 4 is an inside view of a series of aligned orifices 12 on the front surface of the burner. Orifices 12 are sufficiently close together for the flows to merge perfectly in the combustion chamber and for the current emitted through the continuous expansion aperture 5 to be uniform everywhere.

Similarly, the supply compartment 20 is advantageously common to all the orifices 12 to ensure an identical supply of combustible mixture thereto.

The object of the above features is to obtain a uniform flow of combustible mixture over the entire width of the burner. It is also important that this mixture should everywhere enter the chamber under identical temperature conditions. When the mixture flows into the double casing it is advantageous to monitor its path along the burner body.

Figure 5:
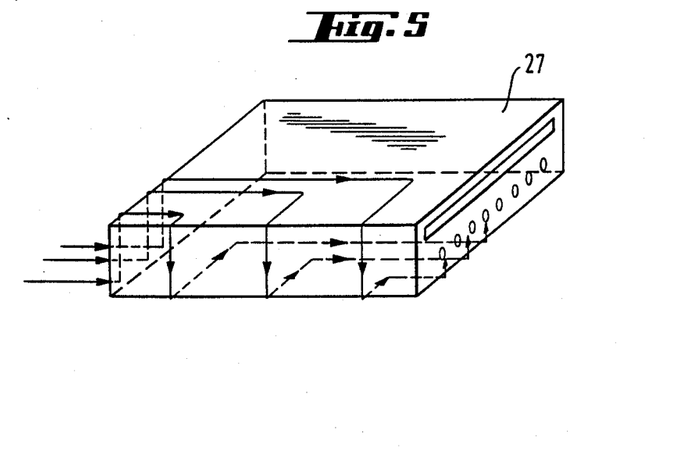
FIG. 5 is a perspective view of a burner as shown in FIG. 3a showing the flow of the combustible gas mixture in a double casing.

FIG. 5 illutrates the principle of the flow of three fractions of combustible mixture along the burner shown diagrammatically at 27. The path of the fractions is denoted by the arrows and is substantially identical in every case. The temperature of these three fractions is therefore substantially the same.

To ensure that the supply of combustible gas follows the type of path shown in FIG. 3, partitions which act as baffles are disposed inside the double casing.

Figure 6:
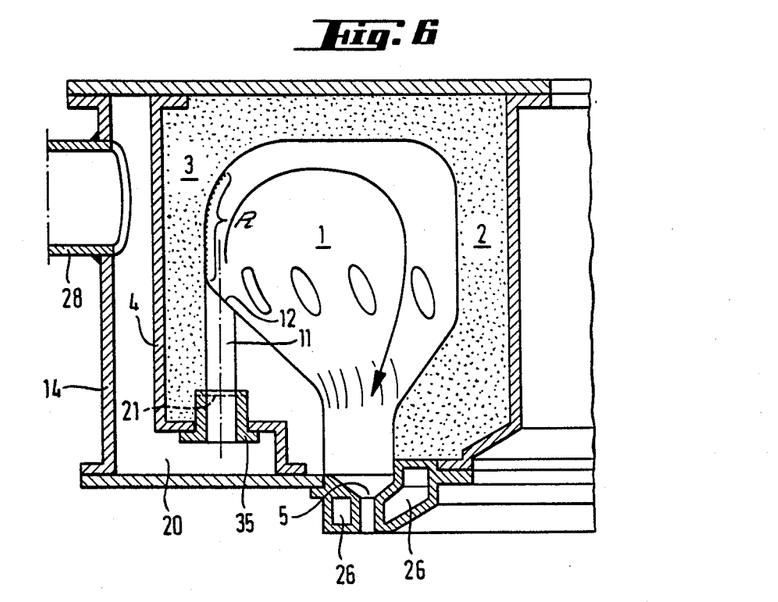
FIG. 6 is a section of part of a burner according to the invention of annular shape.

In FIGS. 4 and 5 the burners illustrated are intended to produce an initially flat stream of gas. In FIG. 6 the burner is of the type used for production of fibres in processes including a centrifugation means. The gas stream produced in this case must uniformly flow along the outer surface of the centrifugation means. For that reason the burner shown in FIG. 6 has a generally annular structure.

Irrespective of the general shape of the burner, its cross-section results in features similar to those indicated hereinbefore. More particularly, the combustible mixture is admitted via a duct 11 discharging into the combustion chamber 1 via an orifice 12 and the combustion products are ejected through the expansion aperture 5 situated on the sane side of the combustion chamber as the orifice 12.

The shape of the combustion chamber 1 is different from that of the preceding burners but the operation is substantially identical for reasons indicated below.

The initial direction of the gases is reversed in the chamber. The incoming gases flow in countercurrent to the outgoing gases. In FIG. 6 the general path of the gases in the chamber is shown by an arrow.

Ignition of the gases is not localized on a grid but is due to the contact with the wall of the chamber raised to high temperature by the surrounding radiation, more patticularly the radiation from the opposite wall to the wall along which the incoming gases flow, and contact with the combustion gases.

As in the case of the previous burners, it is extremely important that the annular burner should produce a uniform combustion gas stream all around the centrifugation means. To this end, the supply ducts 11 are disposed uniformly and sufficiently close together. A uniform flow in these ducts 11 is obtained by means of the single annular supply compartment 20 which equalizes the pressure.

A flame non-return grid 21 may be disposed at the inlet to the duct 11.

It is also possible to provide the inlet to the duct 11 with a ring 35 which acts as a diaphragm so that the speed of the gases is adjustable according to the dimensions of the ring.

Partial pre-heating of the gases in contact with the burner is produced by a double jacket system 4, 14. The combustible mixture is supplied via conduit 28 and flows along the burner wall 4 as far as the supply compartment 20.

The gaseous mixture entering the chamber via the orifice 12 flows along the wall 3 and leaves along the wall 2.

The wall material, which is usually a refractory cement, has small roughened portions R which promote flame engagement.

The formation of the refractory chamber, whether straight or annular, is advantageously made by moulding processes. The cavity corresponding to the chamber itself is produced by the use of a die which is eliminated after drying of the refractory cement, suitable solvents being used to remove the die, which is made for example of expanded polystyrene.

Figure 7:
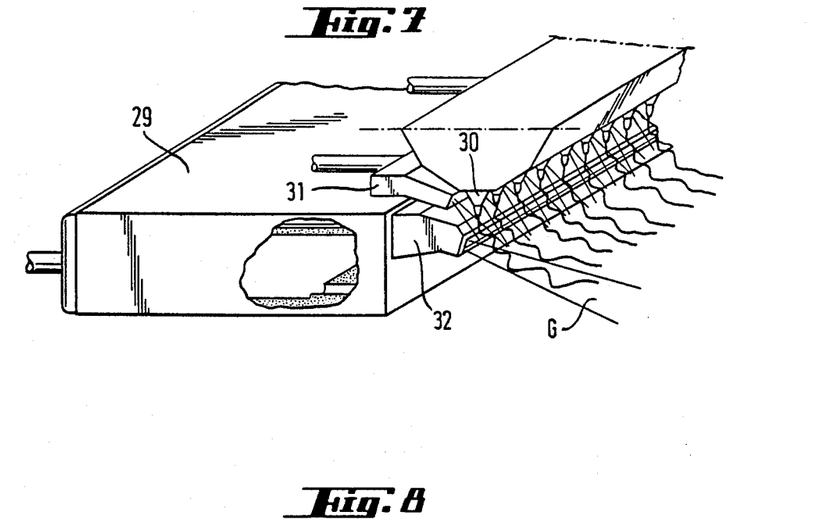
FIG. 7 is a diagrammatic perspective of a fibre forming apparatus using a burner delivering a flat sheet of gases.
Figure 8:
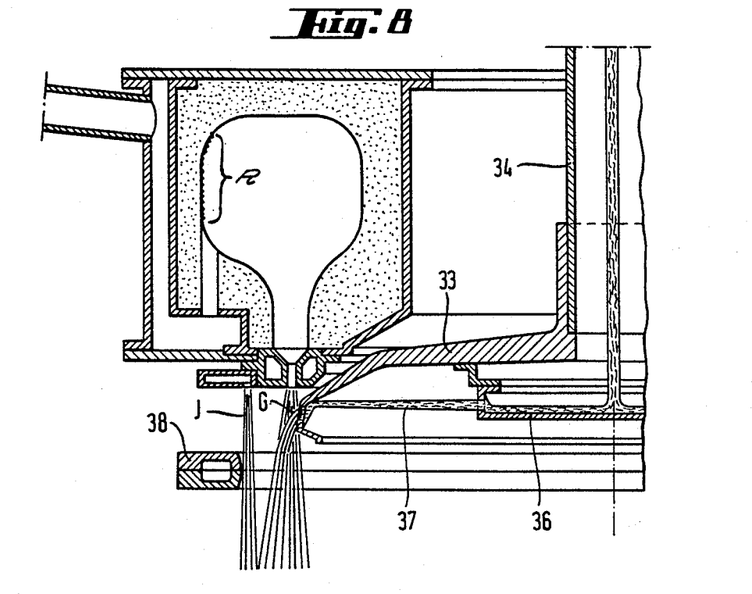
FIG. 8 is a half-section of another fibre forming apparatus in which the burner used is annular.

The use of the burners according to the invention in mineral fibre forming processes has repeatedly been referred to hereinbefore. FIGS. 7 and 8 diagrammatically show the use of these burners for two different types of fibre drawing process.

FIG. 7 relates to the drawing of filaments of materials such as glass, basalt, etc. by neans of a stream of gas G emitted by a burner 29. Molten material filaments are distributed by a die 30.

Gas jets are emitted from a nozzle 31 for each of the molten material filaments delivered by the die. These jets are directly transversely to the stream of gas G into which they penetrate to form an interaction zone in each case which is characterised by the presence of uniform turbulences which promote the introduction and drawing of the filaments of material.

Thi fibre formation technique has been the subject of several French patents and, more particularly, the following FR.A. 2 223 318, FR.A.2 362 222 and FR.A. 2 374 440.

One of the advantages of this method of drawing is that it is applicable to a wide variety of materials, and particularly materials whose temperature is relatively high at the time of drawing, e.g. basalt, hard glasses, or foundry slags. To draw these materials satisfactorily, it is adantageous, if not necessary, to provide a high-speed and high-temperature drawing current. The burners according to the invention are therefore particularly suitable, particularly since production lines conventionally contain a number of assemblies of the kind shown in FIG. 7 in series, and since the space available is limited it is necessary to use small-volume burners.

The burner shown in FIG. 7 is of the type illustrated in FIG. 3a. Its expansion aperture is continued in the form of a projection 32 which directs the stream of gas in the required direction. In view of the temperatures of the gases at the burner outlet it is necessary to provide a cooling system for the projection 32.

Other fibre drawing processes require the use of flat streams of gas at high temperature and high speed. This applies particularly to drawing processes of the "Aerocor" type. In these processes, the naterial to be formed into fibres is first brought into the form of solid primary filaments by cooling filaments delivered by a die. These primary filaments are immersed in a stream of combustion gases emitted by a burner. The temperature and speed cfthe gases simultaneously result in softening and drawing of the filaments.

The use of the burners according to the invention is also advantageous for this type of process.

FIG. 8 shows the method of using a burner according to the invention of annular shape. This burner, which is shown in partial section, is so disposed that the expansion orifice 5 in the form of a continuous slot emits the stream of gas over the entire periphery of a centrifugation means 33. Fibre forming apparatus of this kind is the subject of numerous patent applications. For details of the equipment and operation reference may be made more particularly to French Patent Application No. 2 443 436.

This type of apparatus operates as follows: The molten material is introduced by gravity flow into the hollow shaft 34, which nears the centrifugation means 33. The material is received at the bottom of a basket 36 concentric with the centrifugation means 33 and rotated with the latter. The naterial is distributed at the bottom of the basket 36 and is directed towards the peripheral wall, which is formed with apertures. Projected from the basket in the form of voluminous filaments 37 the material accumulates on the inner surface of the peripheral wall of the centrifugation means 33. In response to centrifugal force it passes through small dimension orifices formed in this wall and is detached in the form of a large number of filaments to be projected into the stream of gas G emitted by the burner.

The temperature of the centrifugation means, which is one of the essential parameters for proper operation of this type of apparatus, is controlled by the naterial, the gases emitted by the burner, and by an induction system 38.

A supplementary gas jet J avoids contact between the filaments produced and the induction ring 38.

The combination of centrifugal projection and entrainment by the high-temperature and high-speed gas streams produces fine and uniform fibres.

In this type of fibre forming apparatus, although the final temperature or speed performances are important, the uniformity of the streams produced and the flexibility of use at different states of operation of the burners according to the invention constitute specially useful advantages. The reduced size is also an important advantage.

Of course the above applications have no limiting force. More particularly in the formation of mineral fibres, the burners according to the invention are applicable to a very wide variety of processes using a stream of gas of high speed and high temperature.

The charecteristics of the invention are also detailed in the following comparative examples:

EXAMPLE 1

Tests were carried out on a conventional burner of the kind shown in FIG. 1 and on a burner according to the ivention of the type shown in FIG. 3a.

The two combustion chambers had the same volume, 18 dm$^3$, and the same outlet section.

One fact must be taken into account immediately with the conventional burner. As the burner reaches its steady state of operation it passes through stages of intense noise corresponding to great instability of the flame. It is difficult to control this burner and it requires considerable experience on the part of the operator.

Tests were made at the maximum thermal loading to vary the operating conditions and more particularly to determine the usual limit conditions of operation.

In the case of the conventional burner, the dynamic pressure and temperatures of the gases at the burner outlet were measured at different rates of flow of natural gas (from Groningen) and air in the combustible mixture admitted to the burner. The results were as follows:

| Gas Nm$^3$/h | 70 | 78 | 104 | 106 |
| Air Nm$^3$/h | 700 | 800 | 1200 | 1250 |
| Pressure mbar | 120 | 130 | 136 | 170 |
| Temperature °C. | 1500 | 1490 | 1380 | 1380 |

When the thermal load increases, the temperature of the gases emitted tends to fall. This may be due to a shorter average residence time in the combustion chamber. It is not possible to obtain a very intense stream of gas, i.e. with a high output and hence high speed and with a very high temperature.

If the thermal load is reduced, there is considerable instability of operation, which immediately takes the form of a noise of intolerable volume. The acceptable operating range is relatively narrow.

Similar tests carried out with the burner according to the invention gave the following results:

| Gas Nm$^3$/h | 68 | 78 | 90 | 98 | 116 |
| Air Nm$^3$/h | 800 | 800 | 900 | 800 | 1170 |
| Pressure mbar | 90 | 95 | 176 | 108 | 190 |
| Temperature °C. | 1330 | 1500 | 1580 | 1730 | 1600 |

As compared with the conventional burner, the development of the temperatures against the output is substantially different. Beyond a certain threshold the temperature tends to fall off as previously but the threshold in question is equivalent to outputs which have been impossible to obtain with the conventional burner.

Thus for a gas output of 78 Nm$^3$/h and an air flow of 800 Nm$^3$/h the temperature obtained in both cases is of the order of 1500° C. When the gas flow reaches bout 100 Nm$^3$/h with the conventional burner the air flow must be increased to about 1200 Nm$^3$/h for operation to be tolerable. On the other hand, with the burner according to the invention, a gas/air ratio closer to the stoichiometric ratio can be maintained and the temperature rises to 1730° C. for an extremely intense stream.

This progression is advantageous in view of the new possibilities it opens up. The working temperatures for drawing hard materials such as basalt and slags are usually above 1600° C. The conventional burner studied would therefore not be usable in fibre forming processes for this type of material.

On the other hand the performances of the burner according to the invention do allow such use. Also, these temperature conditions can be achieved or approached by substantially modifying the supply conditions so that an increased burner gas pressure and hence speed are obtained at the outlet.

EXAMPLE 2

Temperature measurements were taken to show the operational difference between the two types of burner of the previous example.

These measurements were carried out in the zones where ignition develops, i.e. near the grid in the case of the conventional burner and along the wall along which the incoming gases flow in the case of the burner according to the invention.

In all the states of operation indicated previously the measurements taken at the surface of the grid on the combustion chamber side did not exceed the flashpoint of the gas, 550° C. On the other hand, the wall of the combustion chamber along which the gases flow in the case of the burner according to the invention is very rapidly brought to a temperature of the order of 1400° C. after starting. There are even points where the temperature is about 1700° C.

This high temperature is due largely to the radiation from the opposite wall, the temperature of which is higher than 1700° C.

As already indicated, these differences certainly constitute one of the reasons for the performances that the burners according to the invention permit.

EXAMPLE 3

It was stated hereintefore that apart from the advantages in respect of performance there are others which are of greater importance to the use of the burners according to the invention.

More particularly, irrespective of power level, the internal combustion burners are limited to strict operating conditions because of the very violent resonance phenomena which may occur. These phenomena are extremely disturbing acoustically, not only because of their intensity but also because of the frequency range within which they occur.

100 decibels is frequently achieved or exceeded near the burner (about 2 m on the side).

These phenomena are also disturbing in respect of the damage that they cause to the apparatus itself. The refractory lining forming the walls of the combustion chamber is usually very sensitive to intense vibrations which nay occur with poor adjustment. It is therefore of maximum importance to keep the burner operation within conditions in which these phenomena do not occur.

Measurements taken with conventional burners show that a relatively narrow operating condition must be maintained to obviate these phenomena.

Figure 9:
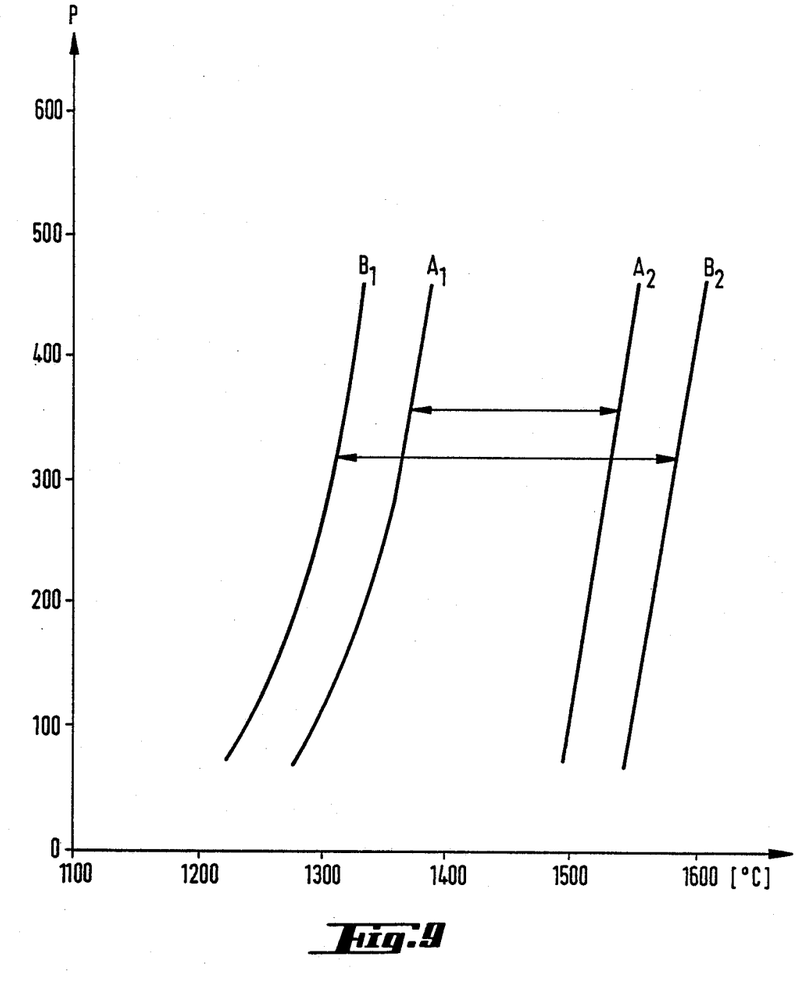
FIG. 9 is a diagram showing the conditions required to obtain good operation of the internal combustion burners.

FIG. 9 is a diagram showing the typical limits that must be observed to obtain acceptable operation of an annular burner of conventional type.

The pressure of the gas inside the chamber is shown on the y-axis in millimetres water column and the temperature of the outgoing gas is shown on the x-axis.

In this graph, curve $A_1$ denotes the bottom limit below which the flame "detaches" from the grid, resulting in flutter which may involve extinction. Curve $A_2$ for the same burner is the limit which cannot be exceeded. It corresponds to the maximum that can be obtained in view of the resonance conditions of the apparatus. The sound intensity at this limit is about 104 decibels. Beyond this limit, if the gas/air ratio were increased in an attempt to increase the temperature, the increase in sound would be catastrophic. The phenomenon would become almost explosive, as shown in Example 1.

It will be apparent from this graph that the burner must be adjusted with the maximum care.

When the steady state of operation has been established, it is possible to maintain suitable conditions without undue difficulty. The starting up of the burner and running up to the steady state of operation, on the other hand, is extremely complex and requires considerable experience on the part of the operator to avoid going beyond acceptable operating limits.

The same graph shows the curves $B_1$ and $B_2$ plotted for a burner accord,ing to the invention as shown in FIGS. 6 and 8. The characteristics of this burner, apart from its specific configuration, and more particularly the volume of the combustion chamber, are similar to those of the conventional burner referred to above.

The general behaviour is of the same nature but it will be seen that the top and bottom limits are widened. so that the possible range of operation is increased very substantially. This is particularly advantageous on starting up of the burner when conditions are not perfectly stable. Thus running up to the steady state, which is conventionally carried out by stages, can be effected in a relatively small number of stages.

It is apparent from the foregoing that the burners according to the invention are very flexible in use when compared with conventional burners. As a result they are also easier to automate.

Acoustically it must also be noted that for a given general sound intensity the conventional burners are very unpleasant to the operators. The dominant frequencies of the burners according to the invention are much lower than with conventional burners and are easier to tolerate.

Also, for a given thermal load, the acoustic measurements made on burners in the steady state of operation show a substantial reduction of the general sound level, which can be put at 10 to 15%.

I claim:

1. Apparatus for attenuating glass fibers by subjecting molten streams of glass to the high velocity, high temperature blast of an internal combustion burner, said apparatus comprising:

means establishing a plurality of streams of molten glass in attenuable condition;

an internal combustion burner, said burner comprising a combustion chamber having opposed, substantially parallel first and second side walls of refractory material, opposed first and second end walls of refractory material extending between said side walls, passage means in said first end wall for directing a flow of combustion gas onto the first of said combustion chamber side walls toward the second of said end walls, said second end wall being configured so as to reverse the flow of said combustion gas and redirect it along said second side wall, said side walls being sufficiently closely spaced stop as to permit the radiant heating of said first side wall by said second side wall and a resultant heating of the combustion gas flowing along said first side wall, and an orifice in said first end wall for passage of combustion products, said orifice restricting expansion of the burning gas to produce a burner combustion chamber pressure substantially in excess of 100 nm water column, thereby providing a directional, high velocity, high temperature blast of combustion products emanating from said combustion chamber through said orifice;

said orifice being located so as to direct said blast into engagement with said streams of molten glass to thereby effect attenuation thereof.

2. The invention as claimed in claim 1 wherein said second end wall is configured in a substantially concave curvature with respect to the combustion chamber to facilitate the reversal of the direction of flow of the gas.

3. The invention as claimed in claim 1 wherein said first side wall of said combustion chamber adjacent said passage means includes roughened portions which contact the flow of combustible gas.

4. The invention as claimed in claim 1 wherein said burner comprises a burner body of refractory material within which said combustion chamber is formed, said burner body being surrounded by a metal casing through which the combustible gas passes for preheating prior to introduction into the combustion chamber.

5. Apparatus for attenuating glass fibers by subjecting molten filaments of glass to the high velocity, high temperature blast of an internal combustion burner, said apparatus comprising:

means establishing a plurality of filaments of molten glass in attenuable condition, said filaments being established in an aligned, spaced relation;

means establishing a high velocity, high temperature blast intercepting said filaments, said blast-establishing means comprising an internal combustion burner including a combustion chamber having opposed, substantially parallel first and second side walls of refractory material, opposed first and second end walls of refractoy material extending between said side walls, passage means in said first end wall for directing a flow of combustion gas onto the first of said combustion chamber side walls toward the second of said end walls, said second end wall being configured so as to reverse the flow of said combustion gas and redirect it along said second side wall, said side walls being sufficiently closely spaced so as to permit the radiant heating of said first side wall by said second side wall and a resultant heating of the combustion gas flowing along said first side wall, and an orifice in said first end wall in the form of a single, continuous slot disposed in close proximity to said filaments for passage of combustion products, said orifice restricting expansion of the burning gas to produce a burner combustion chamber pressure substantially in excess of 100 mm water column, thereby providing a directional, high velocity, high temperature, blast of combustion products emanating from said combustion chamber through said orifice; and means for establishing a plurality of jets directed transversely to said blast, each of said jets being disposed upstream of one of said filaments and penetrating said blast to form an interaction zone within the blast to promote the introduction and attentuation of the filaments.

6. The invention as claimed in claim 5 wherein said second end wall is configured in a substantially concave curvature with respect to the combustion chamber to facilitate the reversal of the direction of flow of the gas.

7. The invention as claimed in claim 5 wherein said first side wall of said combustion chamber adjacent said passage means includes roughened portions which contact the flow of combustible gas.

8. The invention as claimed in claim 6 wherein said burner comprises a burner body of refractory material within which said combustion chamber is formed, said burner body being surrounded by a metal casing through which the combustible gas passes for preheating prior to introduction into the combustion chamber.

9. The invention as claimed in claim 5 wherein said passage means comprises a series of identical, aligned and closely spaced supply orifices for directing the combustible gas onto the first of said combustion chamber sidewalls.

10. The invention as claimed in claim 9 wherein said series of supply orifices communicates with a single supply compartment by means of ducts.

11. The invention as claimed in claim 10 wherein the supply compartment is separated from the ducts by flame non-return means.

12. Apparatus for attenuating glass fibers by subjecting molten filaments of glass to the high velocity, high temperature blast of an internal combustion burner, said apparatus comprising:

means establishing a plurality of filaments of molten glass in attenuable condition, said means comprising centrifugation means including an apertured annular peripheral wall through which molten glass passes in the form of attenuable filaments;

means establishing a high velocity, high temperature blast intercepting said filaments in close proximity to said centrifugation means peripheral wall to effect attenuation thereof, said blast-establishing means comprising an internal combustion burner including a substantially annular combustion chamber having opposed, substantially parallel first and second side walls of refractory material, opposed first and second end walls of refractory material extending between said side walls, passage means in said first end wall for directing a flow of combustion gas onto the first of said combustion chamber side walls toward the second of said end walls, said second end wall being configured so as to reverse the flow of said combustion gas and redirect it along said second side wall, said side walls being sufficiently closely spaced so as to permit the radiant heating of said first side wall by said second side wall and a resultant heating of the combustion gas flowing along said first side wall, and an annular orifice for passage of combustion products in said first end wall in the form of a single, continuous annular slot disposed in close proximity to said filaments, said orifice restricting expansion of the burning gas to produce a burner combustion chamber pressure substantially in excess of 100 mm water column, thereby providing a directional, high velocity, high temperature blast of combustion products emanating from said combustion chamber through said orifice to effect attenuation of said filaments.

13. The invention as claimed in claim 12 wherein said second end wall is configured in a substantially concave curvature with respect to the combustion chamber to facilitate the reversal of the direction of flow of the gas.

14. The invention as claimed in claim 12 wherein said first side wall of said combustion chamber adjacent said passage means includes roughened portions which contact the flow of combustible gas.

* * * * *

UNITED STATES PATENT AND TRADEMARK OFFICE
CERTIFICATE OF CORRECTION

PATENT NO. : 4,818,218
DATED      : April 4, 1989
INVENTOR(S): Rene Gest

It is certified that error appears in the above-identified patent and that said Letters Patent is hereby corrected as shown below:

Column 1, line 12, after "drawn" insert --or attenuated--.

Column 1, line 40, "rear" should be --near--.

Column 1, line 46, "quetion" should be --question--.

Column 2, line 46, "eccording" should be --according--.

Column 2, line 60, "hecones" should be --becomes--.

Column 3, line 4, "inventbn" should be --invention--.

Column 3, line 38, "towads" should be --towards--.

Column 4, line 45, "buner" should be --burner--.

Column 4, line 62, "chamher" should be --chamber--.

Column 5, line 23, "b:uners" should be --burners--.

Column 5, line 25, "paticularly" should be --particularly--.

Column 5, line 31, "gaees" should be --gases--.

Column 5, line 44, "chammber" should be --chamber--.

Column 5, line 46, "fame" should be --flame--.

UNITED STATES PATENT AND TRADEMARK OFFICE
CERTIFICATE OF CORRECTION

PATENT NO. : 4,818,218

DATED : April 4, 1989

INVENTOR(S) : Rene Gest

It is certified that error appears in the above—identified patent and that said Letters Patent is hereby corrected as shown below:

Column 5, line 50, "chamher" should be --chamber--.

Column 5, line 61, "hole" should be --whole--.

Column 6, line 38, "advantageus" should be --advantageous--.

Column 6, line 67, "elong" should be --along--.

Column 7, line 36, "ohtain" should be --obtain--.

Column 7, line 63, "patticularly" should be --particularly--.

Column 7, line 67, "sane" should be --same--.

Column 8, line 11, "patticularly" should be --particularly--.

Column 8, line 52, "neans" should be --means--.

Column 8, line 62 "Thi" should be --This--.

Column 9, line 3, "adantageous" should be --advantageous--.

Column 9, line 19, "naterial" should be --material--.

Column 9, line 24, "cfthe" should be --of the--.

Column 9, line 43, "naterial" should be --material--.

Column 9, line 56, "naterial" should be --material--.

UNITED STATES PATENT AND TRADEMARK OFFICE
CERTIFICATE OF CORRECTION

PATENT NO. : 4,818,218

DATED : April 4, 1989

INVENTOR(S) : Rene Gest

It is certified that error appears in the above—identified patent and that said Letters Patent is hereby corrected as shown below:

Column 10, line 8, "charecteristics" should be --characteristics--.

Column 10, line 14, "ivention" should be --invention--.

Column 10, line 33, "104" should be --100--.

Column 10, line 66, "bout" should be --about--.

Column 11, line 44, "hereintefore" should be --hereinbefore--.

Column 11, line 62, "nay" should be --may--.

Column 13, line 7, "stop" should be --so--.

Column 13, line 49, "refractoy" should be --refractory--.

Signed and Sealed this

Tenth Day of October, 1989

*Attest:*

DONALD J. QUIGG

*Attesting Officer*  *Commissioner of Patents and Trademarks*